United States Patent [19]

Strimel

[11] 3,776,030

[45] Dec. 4, 1973

[54] EXTENSOMETER

[75] Inventor: Robert S. Strimel, Penllyn, Pa.

[73] Assignee: Tinius Olsen Testing Machine Co., Inc., Willow Grove, Pa.

[22] Filed: Oct. 5, 1972

[21] Appl. No.: 295,352

[52] U.S. Cl. ............................................. 73/93
[51] Int. Cl. ............................................ G01n 3/06
[58] Field of Search ............... 73/93, 95, 90, 91, 73/89; 33/147 D, 148 D

[56] References Cited
UNITED STATES PATENTS
2,177,605   10/1939   Whittemore .................... 33/147 D
2,910,778   11/1959   Strimel ........................... 33/148 D Primary Examiner—Jerry W. Myracle
Attorney—Frederick J. Olsson

[57] ABSTRACT

An extensometer unit for detecting the strain in a specimen mounted on a universal testing machine. The strain sensor of the unit being supported by a mechanical system that can swing the sensor against the specimen and hold it in place during the test and then swing the unit away from the specimen after the test is completed.

14 Claims, 14 Drawing Figures

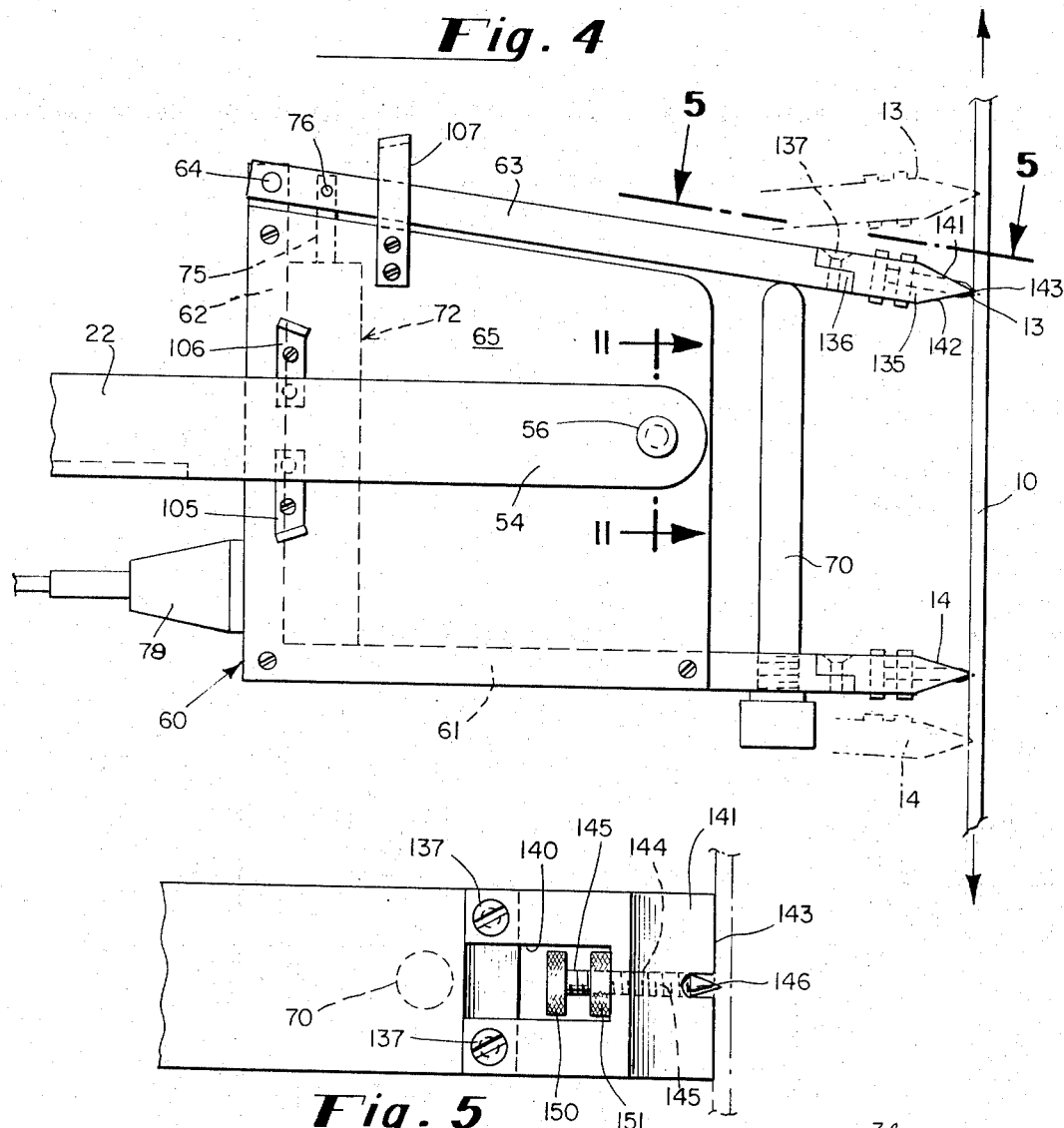
Fig. 4
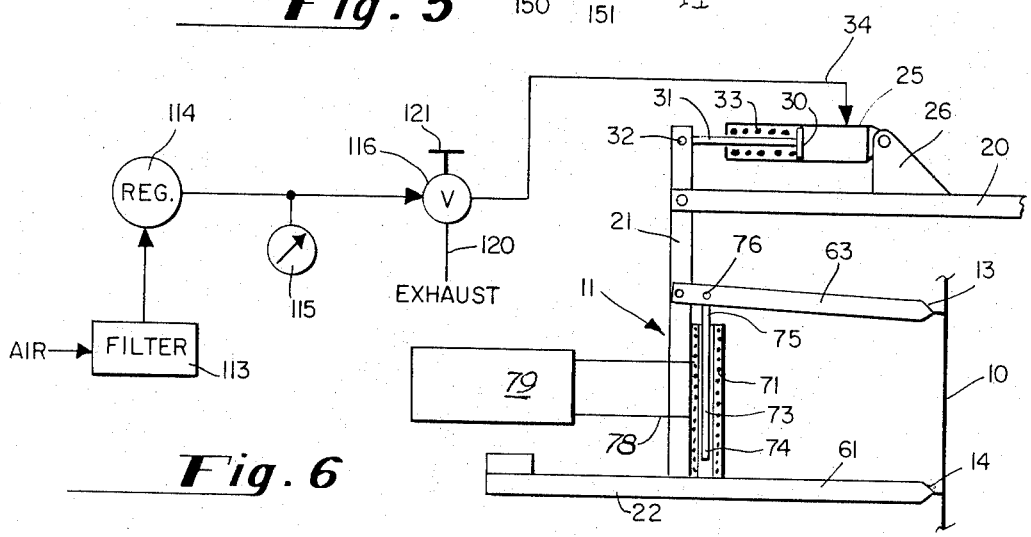
Fig. 5
Fig. 6

PATENTED DEC 4 1973 3,776,030

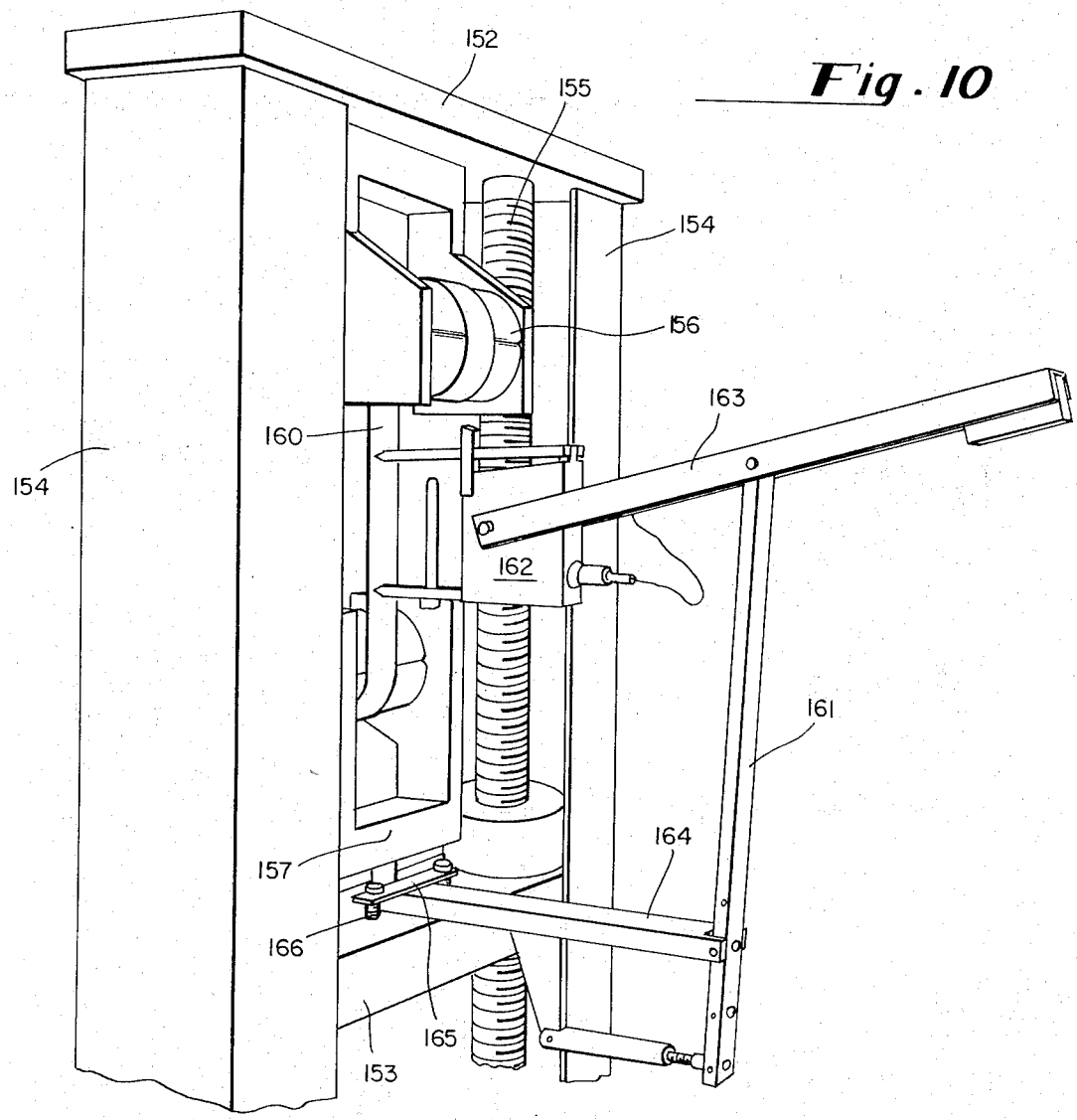
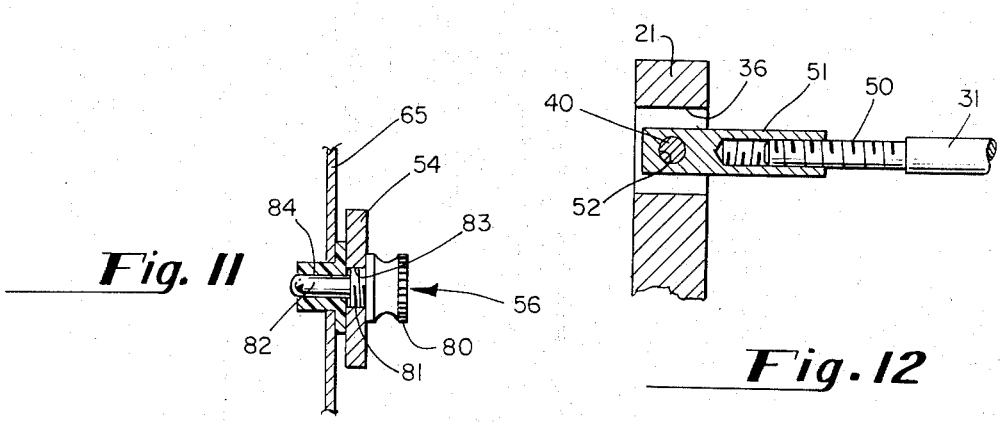

EXTENSOMETER

This invention relates to materials testing equipment and in particular relates to an extensometer to detect strain in a specimen tested in a universal testing machine.

The principal object of the invention is to provide an improved extensometer, the sensor or motion detector of which can be maintained away from the specimen area while the specimen is being loaded then quickly brought up to engage the specimen and be held in such engagement during the test and then moved away after the test has been completed.

Another object of the invention is to provide structure which makes an extensometer of maximum simplicity, reliability and accuracy and which is easy to operate and requires no special skills or extraordinary knowledge.

The preferred forms of the invention and the various features and advantages thereof will be apparent from the description below taken in conjunction with the following drawings wherein.

FIG. 4 is an enlarged elevational view of the strain sensor of FIG. 1 with parts of the sensor being in the position occupied at the start of a test;

FIG. 5 is a planar view taken along line 5 of FIG. 4 and showing the structure of the knife edges;

FIG. 6 is a schsmatic view of the extensometer and air operated drive mechanism for actuating the same;

FIG. 10 is a fragmentary perspective view of a testing machine with the extensometer of the invention secured to the moveable crosshead;

FIG. 11 is view taken along the lines 11—11 of FIG. 4;

FIG. 12 is a fragmentary view partially in section showing certain pivot connections.

Figure 1:
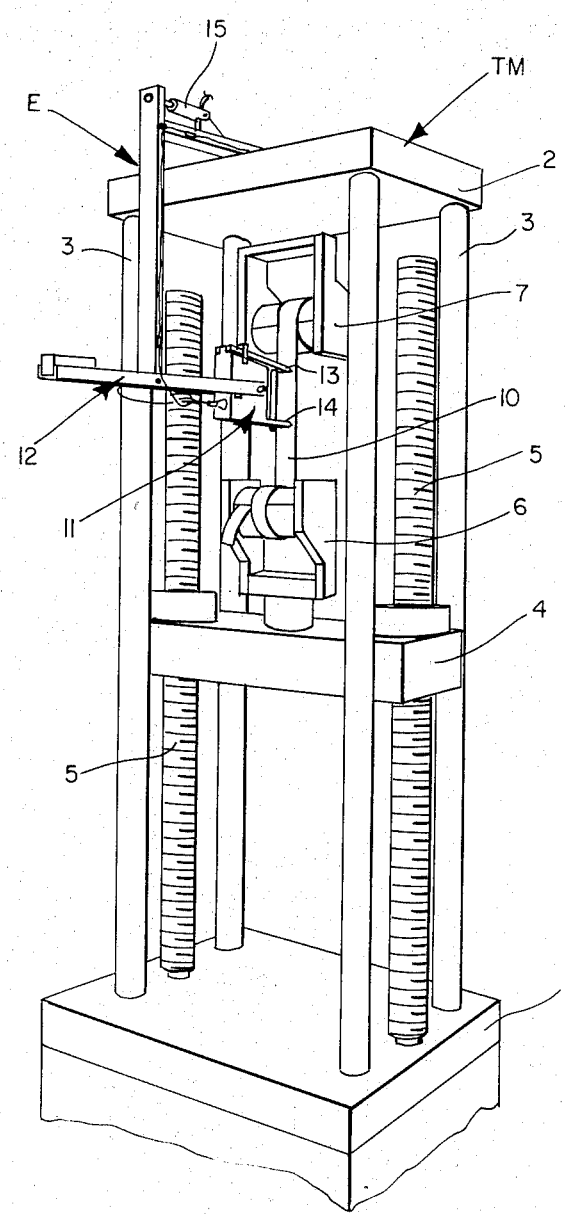
FIG. 1 is a perspective view of a universal testing machine having the extensometer of the invention secured to the fixed crosshead, the instrument being in position for the start of a test.

In FIG. 1 a typical universal testing machine includes the base 1, the fixed crosshead 2, the tie rods 3, the vertically moveable crosshead 4, the drive screws 5 mounting the moveable crosshead, a specimen clamp 6 secured to the moveable crosshead and a specimen clamp 7 secured to the fixed crosshead. The clamps 6 and 7 hold a specimen 10 between the crossheads. Load is applied to specimen 10 by motion of the crosshead 4. Drive mechanism mounted within the base 1 rotates the drivescrews which move the crosshead up or down. In the example shown the specimen is a belt made of woven material and the moveable crosshead is moved down to load the specimen in tension and causing the same to be elongated or to strain.

The extensometer E includes the strain sensor 11 and mounting means 12 which supports the instrument on the testing machine. The sensor 11 has a pair of knife edges 13 and 14 which engage and follow the strain of the specimen and drive a transducer for developing a signal as a function of the strain. The instrument has a self contained drive mechanism 15 which actuates the mounting means whereby the sensor 11 can be moved outwardly away from the specimen area as shown so that a specimen can be removed or loaded without interference. The drive mechanism also actuates the mounting means so that the sensor can be moved in against the specimen as shown and then held firmly in that position during a test so that the knife edges correctly engage the specimen and follow the strain.

Normally the instrument is mounted on the rear of the machine. This avoids interference especially with the loading and unloading of specimens. A typical procedure for making a specimen test is explained following.

The drive means 15 is operated (by mechanism described later) to move the sensor 11 outwardly of the machine. The specimen to be tested is then set up between the clamps 6 and 7. The drive 15 is actuated so that the sensor 11 moves in toward the specimen. Preferrably the sensor is guided inwardly so that the knife edges engage the specimen without disturbing the gage length. The crosshead is then moved to apply load to the specimen and the strain is followed by the knife edges. The drive remains activated during the test to maintain the knife edges firm against the specimen. Whne the desired load level has been reached the test is completed and the drive mechanism is then operated to move the sensor away from the specimen area.

With the above in mind I will now describe the structural details of the sensor and the mounting means.

Figure 2:
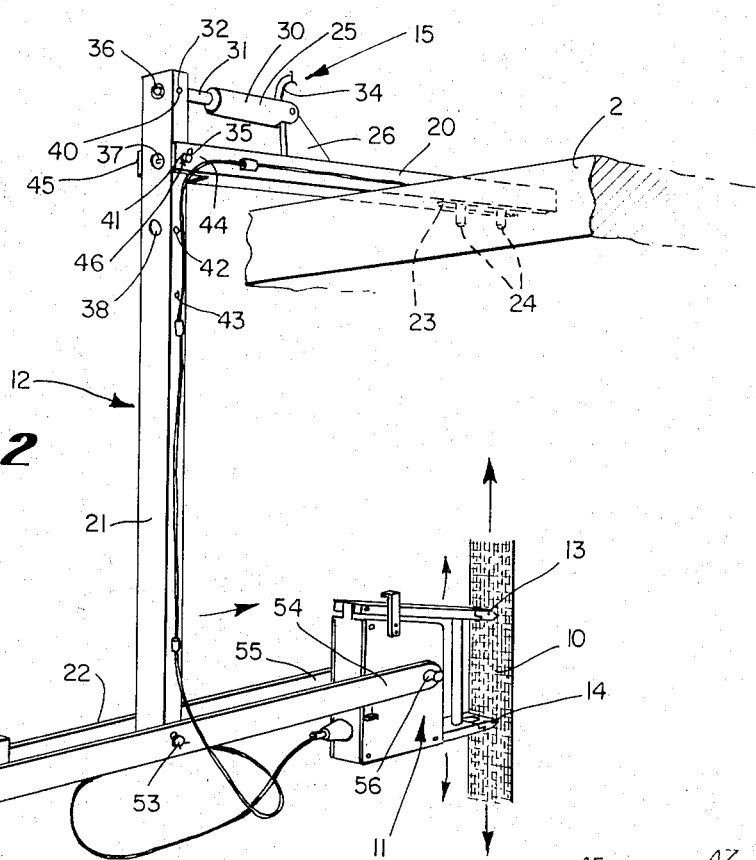
FIG. 2 is an enlarged perspective view of the extensometer of FIG. 1 and showing the position of the strain sensor at the start of a test.

Referring to FIG. 2 the mounting means includes the support bar 20, drive bar 21 and mounting lever 22. The support 20 mounts the instrument on the fixed crosshead 2. For this purpose, the bar is sloted at 23 to accept screws 24 threaded into the head 2. The slot provides for the bar 20 to be desirably positioned on the head and is particularly useful for setting up the instrument on the machine.

The drive means 15 is mounted on the support bar 20. The drive includes the air cylinder 25 pivotally connected to the standard 26 fixed to the bar 20. The cylinder 25 carries a piston 30 (see FIG. 6) mounted for reciprocating motion within the cylinder. The piston rod 31 is connected to the drive bar by pivot pin 32.

The piston 30 is springloaded by spring 33 which moves the piston to the right without the presence of air in the other side of the piston. Air entering the cylinder from the line 34 moves the piston to the left against the force of the spring.

Referring back to FIG. 2 the drive bar 21 is pivotally connected to the support bar 20 by the pivot pin 35. The drive bar can be vertically adjusted with respect to the support bar by removing the pins 32 and 35, moving the bar and aligning holes to reinsert the pins. This is described following.

Figure 2A:
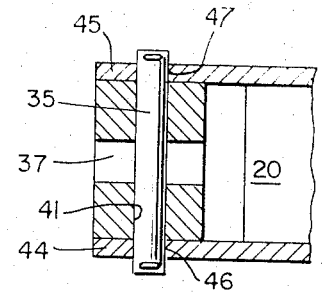
FIG. 2a is an enlarged fragmentary view of certain of the pivots used in the extensometer of FIG. 1.

The drive bar 21 has several clearance apertures 36, 37 and 38 extending thru the bar in the direction of the testing machine. Also, the bar has several pin apertures 40, 41, 42 and 43 which run at 90° to the clearance apertures. The axes of the clearance apertures and the axes of the pin apertures are coplanar. Support bar 20 has a yoke type end forming the arms 44 and 45. The arm 44 has an aperture 46 and arm 45 has an aligned aperture 47. These can be aligned with the pin apertures 40 etc. in the drive bar. As shown in FIGS. 2 and 2a the pin 35 projects thru the aperture 41 in the drive bar 21 and thru the aligned apertures 46 and 47 in the support bar 20. This forms the pivotal connection between the support bar and the drive bar.

Any of the clearance holes 36, 37 and 38 will accept the piston rod 31 and any of the pin apertures 40 etc. will accept the pin 32.

The piston rod 31 is connected with the pin 32 as follows. With reference to FIG. 12 the rod 31 is threaded at 50. The threads carry a head 51 which has a cross slot 52. When the cross slot 52 is aligned with any of the pin slots 40 etc. the pin 40 can be inserted. The described arrangement provides adjustment as between the piston and the drive bar for use in aligning and calibrating the instrument.

As shown the drive bar 21 is at its maximum down position. To position at its maximum upward position the pins 32 and 35 are removed and the drive bar moved up until the clearance 37 is in position to accept the head 51 of the piston rod. The pin hole 42 in the drive bar is aligned with the aperture 46 in the support bar 20 and the pin 35 inserted to hold the drive bar in position. The cross slot 52 in the head 51 is aligned with the pin hole 42 in the drive bar and the pin 35 is inserted. As will be apparent from the foregoing description the clearance hole 37 and the pin hole 42 are used for the intermediate vertical position of the drive bar 21.

On the bottom drive bar 21 is connected to the mounting leer 22 by the pivot pin 53 which extends thru aligned apertures in the lever and in the drive bar.

The mounting lever 22 is channel shaped and the right hand end is in the form of a yoke with the arms 54 and 55 carrying the sensor 11 as by the pivot means 56. The left hand end of the lever 22 carries weight 57, the function of which is to balance the sensor 11.

The strain sensor 11 can be arranged to provide an electrical or a visual signal as a function of strain. The visual signal can be read directly on the sensor while the electrical signal can be used to drive a recorder or other electronic display equipment. The sensor of FIG. 1 developes an electrical signal and structure of the device will be described in connection with FIG. 4.

A frame 60 has a bottom piece 61, an end piece 62, a top piece 63 pivotally connected to the end 62 by the pivot 64 and side plates 65 and 66. The bottom piece 61 carries a knife edge 14 and the top piece 63 carries a knife edge 13. The gage length of the knife edges is fixed by the post 70 which is threaded in the bottom piece 61 and engages the top piece 63.

The device for developing an electrical signal is preferably an LVDT 71 the housing 72 (FIG. 6) of which is fixed to the bottom 61 and side 62 by means not shown. The coil 73 of the LVDT is mounted in the housing 72. The core 74 operates within the coil. The stem 75 of the core is pivotally connected to the top 63 as by the pin 76. The electrical plugin connector for the LVDT is indicated at 78. The plug is connected to electronic display equipment 79.

The pivot arrangement 56 for connecting the strain sensor to the lever 22 is shown in FIG. 11. The pin has a knurled head 80, a threaded section 81 and an extension 82. The threaded section 81 mates with the threads 83 of the arm 54. The extension 82 fits into bushing 84 in the side plate 65. An identical pin arrangement is provided on the arm 55 in axial alignment with 56. The extensions of the pins rotatably support the sensor 11. One particular advantage of the above described arrangement is that the sensor can be quickly removed or placed on the mounting lever.

Figure 9:
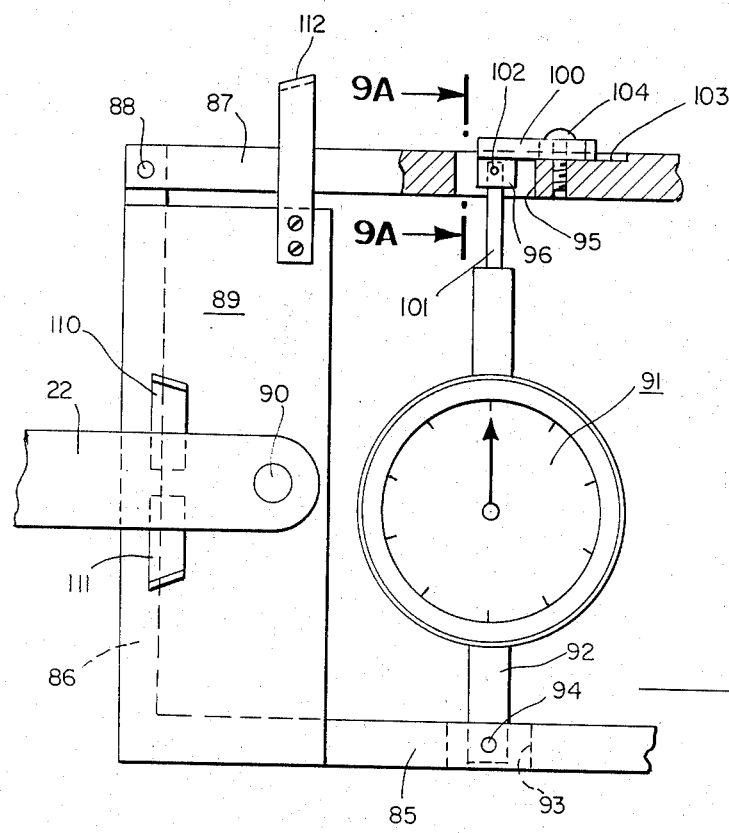
FIG. 9 is a fragmentary elevational view illustrating the use of a dial indicator as a strain sensor.
Figure 9A:
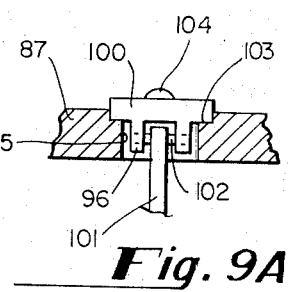
FIG. 9a is a view taken along the lines 9a—9a of FIG. 9.

In lieu of the LVDT to develop an electrical signal the sensor may be equipped with a dial indicator such as shown in FIG. 9 to give a visual strain indication.

The frame includes the bottom 85, the end 86, the top 87 pivotally connected to the end 86 as by pivot 88 and side plates one of which is indicated at 89. The frame is pivorally supported on the lever 22 as by pivot 90.

A dial indicator 91 is mounted as follows. The tube 92 extends thru the clearance hole 93 in the bottom 85 and is pivotally connected to the bottom as by pin 94 extending thru aligned apertures in the bottom and in the stem. On the top 87 a clearance hole 95 accepts the legs 96 of a bracket 100. The stem 101 of the dial indicator is pivotally connected to the legs as by pin 102 extending thru aligned apertures in the legs and in the stem. The bracket 100 is disposed in a slot 103 so that it can be adjusted along the top. The adjustment is used for calibration purposes. The bracket is held in position by the screw 104.

Referring to FIG. 4, the limits of the tilting motion of the sensor 11 with respect to the lever 22 are set by the adjustable keepers 105 and 106. The upper motion of the top piece 63 is controlled by the restraint bar 107. The sensor of FIG. 4 is provided with keepers 110 and 111 similar to the keepers 105 and 106 and also provided with the restraint bar 112 which is similar to the restraint bar 107.

Figure 3:
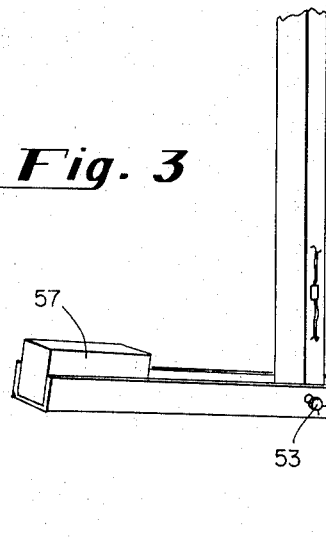
FIG. 3 is a fragmentary perspective view of the extensometer of FIG. 1 showing the position of the strain sensor just as the test has been completed.
Figure 8:
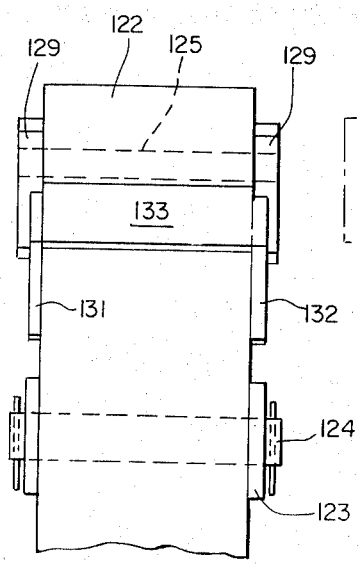
FIG. 8 is a view looking toward the right in FIG. 7.

In the arrangement of FIG. 4 the point of connection (pivot 56) between the lever 22 and the sensor 11 is located between the knife edges 13 and 14 and also is located as close to the specimen as practical. Thus the location of the pivot 56 provides that the projection of a plane containing the axes of the pins 53 and 56 be within the gage limits of the knife edges at the start of the test (FIG. 2) and at the end of the test (FIG. 3). Locating the pivot 56 as close to the specimen as practical increases the efficiency of the force generated by the drive means 15 to maintain the knife edges firm against the specimen during the test. In FIG. 8 the pivot 90 is located beteeen the knife edges and as close to the specimen as possible. The force projection lies within the limits of the knife edges at the start of and during the test.

Referring to FIG. 6 I have shown a typical arrangement for activating the drive mechanism and this will be described below.

The air supply includes the filter 113, pressure regulator 114, the gage 115, control valve 116 which feeds air to the line 34 or connects the line 34 to the exhaust line 120. The valve is of the off-on type and is operated by the knob 121.

Prior to the start of a test the control knob 121 is moved to block air to the line 34 and connect the line 34 to exhaust line 120. The force generated by the spring 33 moves the sensor 11 away from the specimen. To begin the test the knob 121 is moved so that the air is supplied to the line 34 and the force generated by the air on the piston 30 moves the sensnor firm against the specimen and holds the same in position during the tests.

Figure 7:
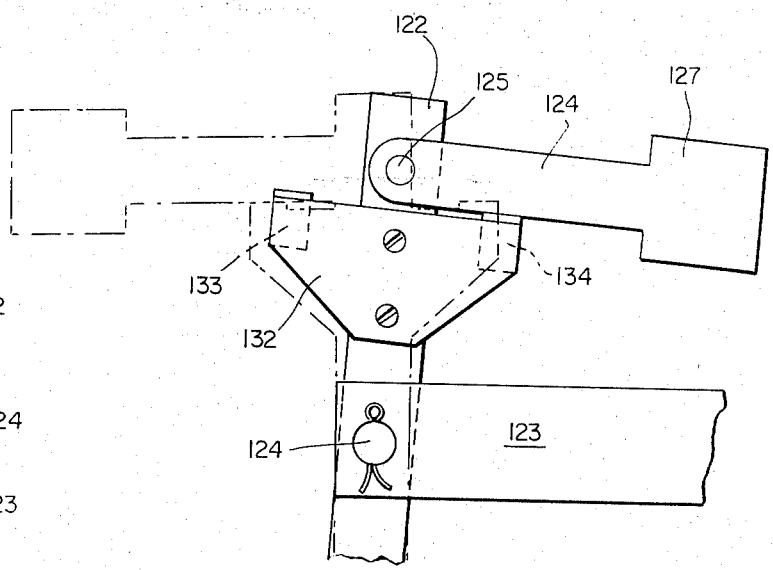
FIG. 7 is a fragmentary elevational view illustrating a mechanical drive mechanism for actuating the extensometer.

In lieu of the air system just described the invention contemplates a mechanical means for moving the sensor toward and away from the specimen. A typical arrangement is shown in FIGS. 7 and 8.

The top end of the drive bar 122 (corresponding to drive bar 21) is connected to support bar 123 (connected to the fixed crosshead) by pivot 124. The top of the bar 122 carries the pivot pin 125 which rotatably supports an arm 126 carrying a weight 127 at its outer end. As noted in FIG. 8 the bar is yoke shaped having arm sections 128 and 129. The pin 125 extends thru aligned apertures in the arm and in the bar form the rotatable pivot. Also mounted on the bar 122 is a frame comprising a pair of plates 131 and 132 fixed to the bar and carrying a pair of blocks 133 and 134. The blocks are raised slightly above the top of the plates. As noted the arm 124 rests on the block 134. The bar 124 can be flipped over as to rest on the bar 133. When the bar is on the block 134 the weight 127 provides a force to move the drive bar 122 so that the sensor 11 moves away from the specimen. When the bar 124 is in contact with the block 134 the weight 127 provides a force to move the sensor against the specimen and hold the same in position during a test.

The structure of the knife edges 13 and 14 provide a special advantage. Each knife edge is identical and only the knife 13 will be described in connection with FIGS. 4 and 5.

A head 135 is shouldered to engage complementary shoulders on top 63 as indicated at 136 to provide a bearing means, the head being held by the screws 137. The head is formed with a centrally located aperture 140. On the outer end of the head are two planar surfaces 141 and 142 which intersect to form the elongated edge 143 for engaging the specimen. A threaded bore 144 is formed on the head. One end of the bore is symmetrical with and open to the edge 143. The other end of the bore is open to the slot 140. Within the bore 144 is a threaded pin 145, one end of which has a needle point 146. The needle point extends outwardly from the endge 143. On the other end of the pin is a knob 150. By rotating knob 150 the position of the needlepoint 146 can be adjusted with respect to the edge 143. The pin also carries a knurled nut 151 which can be tightened up against the head to lock the pin in position.

Before closing it is pointed out that the amount of holding force between the knife edges and the specimen is tailored to the type of specimen being tested. The force should be great enough to hold the knife edges in contact but without causing a significant bend or bow in the specimen. In the control mechanism of FIG. 6 the force is controlled by the regulator 114 and in the embodiement of FIG. 7 the force is controlled by the length of arm 124 and magnitude of weight 127. When the holding force is low, such as is required with specimens made of fabric or similar non-rigid materials, the pin 145 is adjusted with its kneedlepoint spaced slightly away from the edge 143 whereby the point just penetrates the specimen when the knife edge is in contact with the specimen surface. This minimizes the possibility of slippage between knife edge and specimen. When the extensometer is used with rigid type materials, the pin is adjusted inwardly so that the elongated edge alone contacts the specimen and is maintained by the holding force.

In FIG. 10 I have shown how the extensometer may be secured to the moveable crosshead of a testing machine.

The machine includes the fixed crosshead 152, moveable crosshead 153, tie posts 154, drive screws 155, clamps 156 and 157 carrying specimen 160.

The mounting means 161 and strain sensor 162 are identical to the corresponding parts in FIG. 1. The sensor 162 is turned 180° on the mounting lever 163. Also the support bar 164 is held on the moveable crosshead by the strap 165 which is secured by screws 166.

I claim:

1. An extensometer for mounting on a specimen supported between the crossheads of a universal testing machine for sensing the strain of a specimen to be tested, the extensometer comprising:
   a support bar;
   means for mounting the support bar on a crosshead of a testing machine;
   a drive bar;
   pivot means rotatably supporting the drive bar on the support bar;
   a mounting lever;
   pivot means rotatably supporting the mounting lever on the drive bar;
   strain sensor means rotatably mounted adjacent one end of the mounting lever, the sensor means including a pair of relatively moveable knife edges for engaging a specimen and following the strain thereof; and
   pivot means rotatably connecting the strain sensor to the lever bar;
   drive means connected with the drive bar for rotating the bar alternatively in opposite directions, rotation of the drive bar in either direction causing movement of the mounting lever therewith; and
   said parts including the support bar, drive bar, mounting lever, strain sensor and pivot means being constructed and arranged so that when the parts are mounted on a specimen, rotation of the drive bar in one direction moves and holds the sensor means away from the specimen area and rotation of the drive bar in the opposite direction moves the sensor to the specimen area so that the knife edges engage and are held against the specimen.

2. A construction in accordance with claim 1 wherein said drive means comprises a cylinder mounted on the support bar and a piston mounted for reciprocating motion in the cylinder, the piston being connected with the drive bar so that motion of the piston in the cylinder in one direction causing rotation of the drive bar to move the sensor means away from the specimen area and motion of the piston in the cylinder in the opposite direction causing rotation of the drive bar to move the sensor means to the specimen area so that the knife edges engage and are held against the specimen.

3. A construction in accordance with claim 2 wherein the pivot means rotatably mounting the drive bar on the support bar comprises:
   a plurality of clearance holes arranged one above the other on the drive bar;
   a pin;

a plurality of pin holes in the drive bar respectively coplanar with and extending at right angles to the clearance holes;

an independent pin hole in the drive bar, spaced below the lower of said plurality of pin holes, said pin holes each being adapted to accept said pin;

a pin hole in said support bar and aligned with one of said drive bar pin holes and said pin extending thru said aligned holes whereby to form the pivot means rotatably supporting the drive bar on the support bar.

4. A construction in accordance with claim 3 wherein the means connecting the drive means piston with the drive bar comprises:

a rod connected to said piston, the rod having a threaded end;

a head threaded on said end and extending into one of said clearance holes and being dimensioned to extend into any of said clearance holes; and a cross slot in said head and aligned with one of said pin holes;

and a pin extending thru the cross slot and the aligned pin hole whereby to form the connection between the piston and drive bar.

5. A construction in accordance with claim 1 wherein said drive means comprises a weight and means rotatably connecting the weight with the drive bar and providing for the weight to be rotated to a first position on one side of the drive bar and to a second position on the opposite side of the drive bar, said first position of the weight causing rotation of the drive bar to move the sensor means away from the specimen area and said second position of the weight causing rotation of the drive bar to move the sensor means to the specimen area so that the knife edges engage and are held against the specimen.

6. A construction in accordance with claim 5 wherein said drive means includes an arm carrying said weight, pivot means connecting the arm to the drive bar and abutement means connected to the drive bar and positioned to engage the arm to establish the two positions.

7. A construction in accordance with claim 1 wherein said means for mounting the support bar includes mechanism for mounting the bar on a fixed crosshead.

8. A construction in accordance with claim 1 wherein said means for mounting the support bar includes mechanism to mount the bar on a moveable head of a testing machine.

9. A construction in accordance with claim 1 wherein said strain sensor comprises: a frame; a pair of knife edges mounted on the frame for relative motion toward and away from one another, the knife edges being adapted to engage a specimen and follow the strain thereof; and motion detector means connected between the knife edges to measure the relative motion of the knife edges and provide an indication thereof.

10. A construction in accordance with claim 9 wherein each knife edge comprises:

a head including two planar surfaces intersecting to form an elongated edge for engaging the specimen;

a threaded bore formed in the head, one end of which is symmetrically disposed with respect to the elongated edge;

a slot formed in said head and the other end of said threaded bore being open to the slot;

a threaded pin disposed in said threaded bore and having a needle point end extending outwardly beyond the elongated edge and the other end of the pin extending into said slot, the threads providing for the pin to be shiftable in the apperture to adjust the distance between the elongated edge and the needle point.

11. A construction in accordance with claim 9 wherein the pivot means connecting the strain sensor to the mounting lever comprises a pair of pivots coaxially mounted between the knife edges and respectively connected between the mounting lever and the frame.

12. A construction in accordance with claim 1 wherein said strain sensor comprises the frame and a pair of knife edges mounted on the frame for relative motion toward and away from one another, the knife edges being adapted to engage a specimen and follow the strain thereof and an electrical transducer connected between said knife edges for developing an electrical signal as a function of the relative motion of the knife edges.

13. A construction in accordance with claim 1 wherein said strain sensor comprises a frame and a pair of knife edges mounted on the frame for relative motion toward and away from one another, the knife edges being adapted to engage a specimen and follow the strain thereof and a dial indicator connected between said knife edges for developing a visual signal as a function of the relative motion of the knife edges.

14. A construction in accordance with claim 1 wherein said pivot means connecting the strain sensor to the mounting lever comprises a pair of aligned, spaced apart appertures on the strain sensor means and a pair of pins coaxially aligned with said appertures, the pins being respectively removeably threaded in the mounting lever and each having an extension respectively projecitng into an apperture whereby to rotatably support the strain sensor.

* * * * *